(12) United States Patent
Satoh

(10) Patent No.: US 6,243,726 B1
(45) Date of Patent: Jun. 5, 2001

(54) ELECTRONIC CALCULATING APPARATUS UTILIZING INPUT AND DISPLAY OF EXPRESSIONS IN TEXTBOOK AND SINGLE LINE FORMATS

(75) Inventor: Akiyoshi Satoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/058,285

(22) Filed: Apr. 10, 1998

(30) Foreign Application Priority Data

Apr. 14, 1997 (JP) .................................................. 9-095385

(51) Int. Cl.$^7$ .................................................. G06F 15/00
(52) U.S. Cl. .......................... 707/531; 708/530; 708/520
(58) Field of Search .................................. 707/517, 526, 707/530, 531, 538; 708/137, 130, 204, 131, 530, 142, 520; 345/33

(56) References Cited

U.S. PATENT DOCUMENTS

| | | | |
|---|---|---|---|
| 4,821,228 | * 4/1989 | Wickes et al. | 708/530 |
| 4,852,057 | * 7/1989 | Patton | 708/136 |
| 4,885,714 | * 12/1989 | Eisenstein et al. | 708/131 |
| 5,067,102 | * 11/1991 | Eisenstein | 708/142 |
| 5,249,147 | * 9/1993 | Koumo et al. | 708/520 |
| 5,432,721 | * 7/1995 | Satoh | 708/168 |
| 5,450,095 | * 9/1995 | Nagoya | 345/33 |
| 5,526,475 | * 6/1996 | Razdow | 707/538 |
| 5,528,524 | * 6/1996 | Oba et al. | 708/142 |
| 5,544,262 | * 8/1996 | Pagallo | 707/538 |
| 5,890,179 | * 3/1999 | Naito | 707/530 |

FOREIGN PATENT DOCUMENTS

| | | |
|---|---|---|
| 4-252351 | 9/1992 | (JP) . |
| 5-35685 | 2/1993 | (JP) . |
| 6-202989 | 7/1994 | (JP) . |

OTHER PUBLICATIONS

Allan Simpson, 1993, Master WordPerfect 5.1&5.2 for Windows, p. 754–765.*

Mathematica For Windows, Student Version 2.2, 1993 by Wolfram Research [screenshots from application] pp. 1–15, Apr. 1993.*

* cited by examiner

Primary Examiner—Stephen S. Hong
Assistant Examiner—William L. Bashore
(74) Attorney, Agent, or Firm—Nixon & Vanderhye P.C.

(57) ABSTRACT

Objects of the present invention are to realize that a plurality of mathematical expressions are inputted and displayed within the same screen in textbook book format, and that a plurality of mathematical expressions are inputted and displayed in textbook book format and one line format. A plurality of mathematical expressions which are inputted in textbook book format or one line format by use of a keyboard are stored into an expression storing buffer on a data storing RAM memory. The plurality of stored mathematical expressions are developed on a main buffer and a sub buffer of a display forming buffer on the data storing RAM memory, and an image which is produced by synthesizing the display data of the two display forming buffers is formed in VRAM on the data storing RAM memory by using CG data on a program ROM, and displayed on a liquid crystal display via a liquid crystal driver. A small electronic apparatus has a system in which these processes are performed by operating CPU in accordance with a program on the program ROM.

16 Claims, 12 Drawing Sheets

```
     ┌─────────────────────────┐
  1  │         ┌──────         │
  2  │         │  2            │
  3  │       √ │ A  - 2 B      │
  4  │ Y 1 = ─────────────     │
  5  │         3      3        │
  6  │         C   + D         │
  7  │                         │
  8  │                         │
  9  │                         │
 10  │                   2     │
 11  │ Y 3 = ( s i n  X )  + 1 │
     └─────────────────────────┘
        MAIN BUFFER 18
```

FIG. 2B

```
     ┌─────────────────────────┐
  1  │        1     2          │ 1
  2  │ Y 2 = ───── X  + 3      │ 2
  3  │          2              │ 3
  4  │                         │ 4
     │                         │
     │                         │
     │                         │
     │                         │
     │                         │
     │                         │
     │                         │
     └─────────────────────────┘
        SUB BUFFER 19
```

FIG. 2C

```
     ┌─────────────────────────┐
  1  │         ┌──────         │
  2  │         │  2            │
  3  │       √ │ A  - 2 B      │
  4  │ Y 1 = ─────────────     │
  5  │         3      3        │
  6  │         C   + D         │
  7  │                         │
  8  │         1     2         │
  9  │ Y 2 = ───── X  + 3      │
 10  │          2              │
 11  │                         │
     └─────────────────────────┘
  VRAM 20 (SYNTHESIZED IMAGE OF DISPLAY DATA OF BUFFERS)
```

FIG. 2D $$Y1 = \frac{\sqrt{A^2 - 2B}}{C^3 + D^3}$$

$$Y2 = \frac{1}{2} X^2 + 3$$

DISPLAY SCREEN 21

FIG. 3

$$Y1 = \frac{\sqrt{A^2 - 2B}}{C^3 + D^3}$$

$$Y2 = \frac{1}{2}X^2 + 3$$

$$Y3 = (\sin X)^2 + 1$$

$$Y4 = 1.23X + 2.35A - 4.75B$$

$$Y5 = \frac{A}{2}X^2 + BX + C$$

FIG. 4A $$Y1 = \frac{\sqrt{A^2 - 2B}}{C^3 + D^3}$$

— MAIN BUFFER 18

FIG. 4B $$Y2 = \frac{1}{2}X^2 + 3$$

— SUB BUFFER 19

FIG. 4C $$Y1 = \frac{\sqrt{A^2 - 2B}}{C^3 + D^3}$$

$$Y3 = (\sin X)^2 + 1$$

— MAIN BUFFER 18

FIG. 4D $$Y1 = \frac{\sqrt{A^2 - 2B}}{C^3 + D^3}$$

$$Y3 = (\sin X)^2 + 1$$

$$Y4 = 1.23X + 2.35\cdots$$

— MAIN BUFFER 18

FIG. 5A $$Y1 = \frac{\sqrt{A^2 - 2B}}{C^3 + D^3}$$

—21a

1ST DISPLAY STEP

FIG. 5B $$Y1 = \frac{\sqrt{A^2 - 2B}}{C^3 + D^3}$$

$$Y2 = \frac{1}{2}X^2 + 3$$

—21b

2ND DISPLAY STEP

FIG. 5C $$Y1 = \frac{\sqrt{A^2 - 2B}}{C^3 + D^3}$$

$$Y2 = \frac{1}{2}X^2 + 3$$

$$Y3 = (\sin X)^2 + 1$$

—21c

3RD DISPLAY STEP

FIG. 5D

FIG. 6A $$Y1 = \frac{1}{253} + 1.2^3$$

$$Y1 = \frac{1}{253} + 1.2^3$$

DISPLAY IN TEXT BOOK FORMAT

FIG. 6B $Y2 = 1.234X^2 + 2X - 3.59$ $Y2 = 1.234X^2 + 2X - 3.59$

DISPLAY IN 1 LINE FORMAT

FIG. 6C $$Y1 = \frac{1}{253} + 1.2^3$$
$Y2 = 1.234X^2 + 2X - 3.59$

MIXED DISPLAY OF TEXT BOOK FORMAT & 1 LINE FORMAT

FIG. 7A

| | 1 | 2 |
|---|---|---|
| 1 | | |
| 2 | Y2 = —— X + 3 | |
| 3 | 2 | |
| 4 | | |
| 5 | | |
| 6 | | |
| 7 | | |
| 8 | | |
| 9 | | |
| 10 | | |
| 11 | | |
| 12 | | |
| 13 | | |

MAIN BUFFER 18

FIG. 7B

| | 1 | 2 |
|---|---|---|
| 1 | | |
| 2 | Y2 = —— X + 3 | |
| 3 | 2 | |
| 4 | | |
| 5 | | 2 |
| 6 | Y3 = (sin X) + 1 | |
| 7 | | |
| 8 | | |
| 9 | | |
| 10 | | |
| 11 | | |
| 12 | | |
| 13 | | |

MAIN BUFFER 18

FIG. 7C

| 1 | Y4 = 1.23X + 2.35A |
| 2 | |
| 3 | - 4.75B |
| 4 | |
| 5 | |
| 6 | |
| 7 | |
| 8 | |
| 9 | |
| 10 | |
| 11 | |
| 12 | |
| 13 | |

SUB BUFFER 19

FIG. 7D

| | 1 | 2 |
|---|---|---|
| 1 | | |
| 2 | Y2 = —— X + 3 | |
| 3 | 2 | |
| 4 | | |
| 5 | | 2 |
| 6 | Y3 = (sin X) + 1 | |
| 7 | | |
| 8 | | |
| 9 | | |
| 10 | A | 2 |
| 11 | Y5 = —— X + BX + C | |
| 12 | 2 | |
| 13 | | |

MAIN BUFFER 18

FIG. 8A $Y2 = \dfrac{1}{2} X^2 + 3$ $Y3 = (sin\ X)^2 + 1$

— 21d

1ST DISPLAY STEP

FIG. 8B $Y2 = \dfrac{1}{2} X^2 + 3$ $Y3 = (sin\ X)^2 + 1$ $Y4 = 1.23X + 2.35A - 4.75B$ — 21e

2ND DISPLAY STEP

FIG. 8C $Y2 = \dfrac{1}{2} X^2 + 3$ $Y3 = (sin\ X)^2 + 1$ $Y4 = 1.23X + 2.35A - 4.75B$ $Y5 = \dfrac{A}{\ } X^2 + BX + C$ — 21f

3RD DISPLAY STEP

EXPRESSION: $Y1 = \dfrac{\sqrt{A^2 - 2B}}{C^3 + D^3}$

FIG. 9B PRIOR ART

DISPLAY IN TEXT BOOK FORMAT

FIG. 9C PRIOR ART

DISPLAY IN 1 LINE FORMAT

FIG. 10A PRIOR ART

EXPRESSION : $Y1 = 1.235X^3 + 0.2567X^2 + 4.58X + 1.5$

FIG. 10B PRIOR ART

DISPLAY IN TEXT BOOK FORMAT

FIG. 10C PRIOR ART

DISPLAY IN TEXT BOOK FORMAT WHEN SCREEN IS SCROLLED

FIG. 10D PRIOR ART

DISPLAY IN 1 LINE FORMAT

ELECTRONIC CALCULATING APPARATUS UTILIZING INPUT AND DISPLAY OF EXPRESSIONS IN TEXTBOOK AND SINGLE LINE FORMATS

BACKGROUND OF THE INVENTION

1. Field of the Invention

The present invention relates to a small electronic apparatus such as a scientific calculator capable of performing input and display of a mathematical expression in textbook format.

2. Description of the Related Art

As prior art, there has been known Japanese Unexamined Patent Publications JP-A 4-252351 (1992), JP-A 5-35685 (1993), JP-A 6-202989 (1994) and so on.

First, JP-A 4-252351 discloses input of an expression in textbook format. Further, JP-A 5-35685 discloses input and edit in textbook format, particularly in respect of a fraction. Further, JP-A 6-202989 discloses input and editing of an expression in simplified textbook format.

According to the prior art, as described in the above-mentioned publications, in a small electronic apparatus, when a mathematical expression is input and displayed in textbook format, the object of the input and display is only one mathematical expression, and a plurality of mathematical expressions inputted cannot be displayed within the same screen at the same time.

Figure 9A:
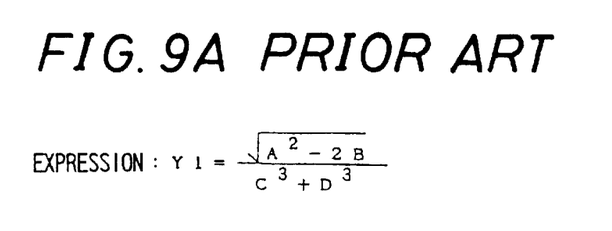
FIGS. 9A, 9B and 9C are diagrams showing examples of displaying a complicated expression in textbook book format and one line format according to a prior art.
Figure 9B:
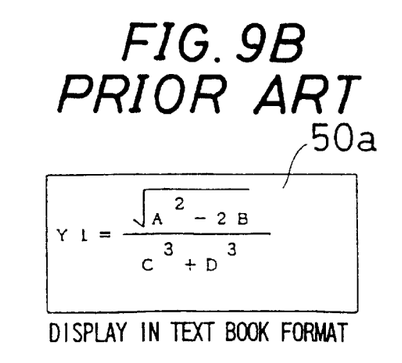
Figure 10A:
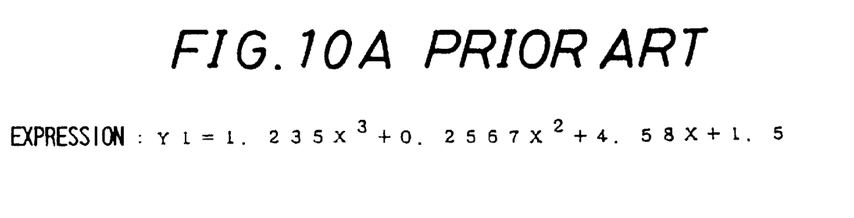
FIGS. 10A, 10B, 10C and 10D are diagrams showing examples of displaying a long expression in textbook book format and one line format according to a prior art.
Figure 10B:
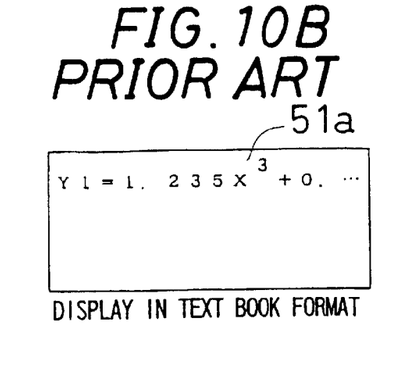
Figure 10C:
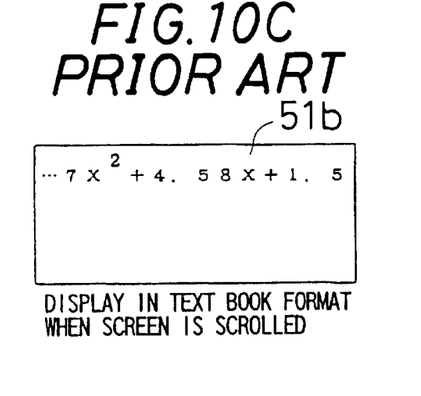

Further, when such a mathematical expression as shown in FIG. 9A is displayed in textbook format, the outline of the expression can be easily understood at a glance as shown by a screen 50a of FIG. 9B. However, since a display is performed in a horizontal line, when such a mathematical expression as shown in FIG. 10A is displayed in textbook format in a small electronic apparatus having a display unit whose screen has a small lateral width, a long mathematical expression cannot be displayed within a screen 51a as shown in FIG. 10B, and the whole of the expression cannot be seen unless a screen 51b is displayed by scrolling the screen 51a as shown in FIG. 10C.

Figure 9C:
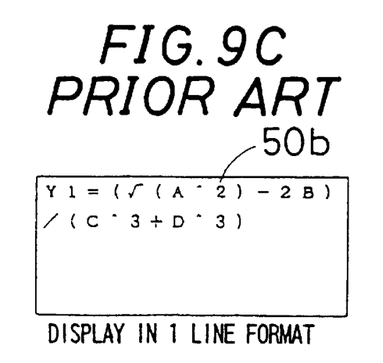
Figure 10D:
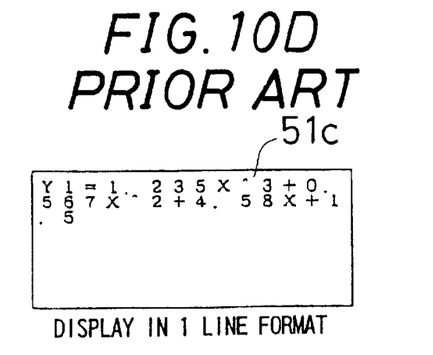

Meanwhile, in one line format, even in the case of a long expression, the whole of the expression can be seen as shown by a screen 51c in FIG. 10D, but there is a disadvantage in that when the expression is complicated, the outline of the expression is difficult to understand as shown by a screen 50b in FIG. 9C.

Further, in the prior art, it is impossible to input and edit mathematical expressions within the same screen in a state that these two different formats coexist.

In the prior art, a plurality of mathematical expressions can be inputted and displayed within the same screen only in one line format, and on the other hand, only every one expression can be inputted and displayed within the same screen in textbook format.

Hence, the invention makes it possible to input and display a plurality of mathematical expressions within the same screen in textbook format.

Further, in the prior art, in order to display mathematical expressions within the same screen, only one or the other of textbook format and one line format can be selected, and it is impossible to have both formats to coexist.

Hence, in order to utilize both characteristics that the outline of a mathematical expression is easy to understand in textbook format and that the whole of a mathematical expression can be seen at a glance in one line format, the invention causes both formats to coexist, so that a plurality of mathematical expressions are inputted and displayed.

SUMMARY OF THE INVENTION

Objects of the invention are to display a plurality of inputted mathematical expressions within the same screen in textbook format and to display a plurality of inputted mathematical expressions within the same screen in textbook format and one line format.

In a first aspect of the invention, a small electronic apparatus for inputting and displaying mathematical expressions in textbook format and one line format is characterized in that a plurality of mathematical expressions can be inputted and displayed within one and the same screen in textbook book format.

According to the first aspect of the invention, when mathematical expressions are inputted and displayed in textbook format, a plurality of mathematical expressions can be easily operated within the same screen.

In a second aspect of the invention, a small electronic apparatus for inputting and displaying mathematical expressions in textbook format and one line format is characterized in that a plurality of mathematical expressions can be inputted and displayed within one and the same screen in a state where textbook format and one line format will coexist.

According to the second aspect of the invention, since a plurality of mathematical expressions can be displayed within the same screen in a state that textbook format and one line format coexist, it is possible to select a display format suitable for an individual mathematical expression.

In a third aspect of the invention, a small electronic apparatus comprises:

inputting means for inputting a plurality of mathematical expressions in textbook book format;

storing means for storing the plurality of inputted mathematical expressions in an order in which the expressions are inputted;

designating means for designating one of the plurality of inputted mathematical expressions;

editing means for editing the designated mathematical expression, the editing means having a first buffer for storing mathematical expressions not to be edited and a second buffer for storing mathematical expressions to be edited; and displaying means for synthesizing and displaying the mathematical expressions stored in the respective buffers in the order in which the expressions are inputted.

According to the third aspect of the invention, the plurality of mathematical expressions inputted in textbook format can be displayed within the same screen.

In a fourth aspect of the invention, the small electronic apparatus further comprises edit controlling means for, when there is a blank region in the first buffer and a mathematical expression is subsequently designated, judging whether the designated mathematical expression is a mathematical expression to be edited, and for, when the mathematical expression is judged to be edited, forming a predetermined sized blank region in the first buffer as well as storing the designated mathematical expression into the second buffer, and when the mathematical expression is judged not to be edited, storing the designated mathematical expression into the first buffer as well as forming a predetermined sized blank region in the first buffer.

According to the fourth aspect of the invention, by use of the edit controlling means, a plurality of mathematical expressions inputted and edited in textbook format can be easily synthesized to insure display within the same screen.

In a fifth aspect of the invention, the displaying means, when there is no blank region in the first buffer or when no mathematical expression is subsequently designated, synthesizes and displays mathematical expressions stored in the respective buffers in an order in which the expressions are inputted.

According to the fifth aspect of the invention, a plurality of mathematical expressions inputted and edited in textbook format can be surely displayed within the same screen.

In a sixth aspect of the invention, the inputting means is for inputting not only a mathematical expression in textbook format but also a mathematical expression in the one line format to be inputted.

According to the sixth aspect of the invention, a plurality of mathematical expressions inputted in textbook format and one line format can be displayed within the same screen in a state that both formats coexist.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
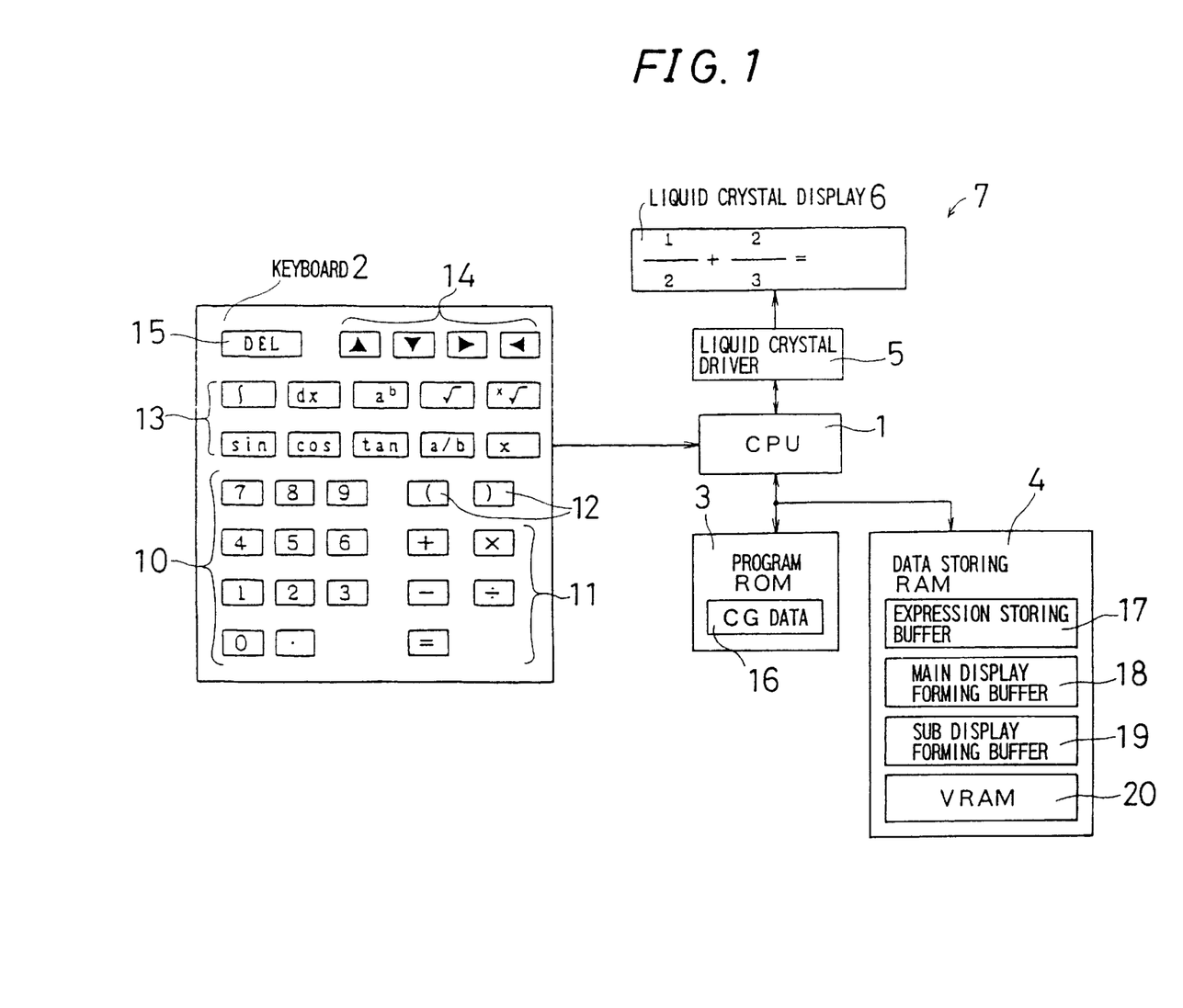
FIG. 1 is a system block diagram of an apparatus in which the invention is adopted.

FIG. 1 is a system block diagram of an apparatus in which the present invention is adopted.

The apparatus is constituted by CPU 1 for controlling the system, a keyboard 2 connected to the CPU 1 for performing an input, a program ROM 3 for storing a program, a data storing RAM memory 4 for storing mathematical expression data or the like when the program is in operation, a liquid crystal driver 5, and a liquid crystal display 6 for performing a display operation via the liquid crystal driver 5.

Further, the program ROM 3 stores also character generator data (CG data) 16 for performing a display operation.

Further, the data storing RAM memory 4 has an expression storing buffer 17, a main display forming buffer 18, a sub display forming buffer 19, and VRAM 20.

Further, the keyboard 2 has a plurality of keys 10 through 15 and is constituted in a manner that mathematical expressions can be inputted by using the keys 10 through 15. The plurality of keys are constituted by numerical value keys 10, arithmetical operation keys 11, parentheses keys 12, function keys 13, cursor keys 14, a deletion key 15 or the like. Further, an edition of inputted mathematical expressions, i.e. deletion therefrom or addition thereto, can be effected by using the keys 10 through 15.

A mathematical expression can be inputted in textbook format and one line format. The textbook format is a format in which a plurality of lines are required to display, and the one line format is a format in which a display operation can be performed in one line.

(First Embodiment)

Figure 2A:
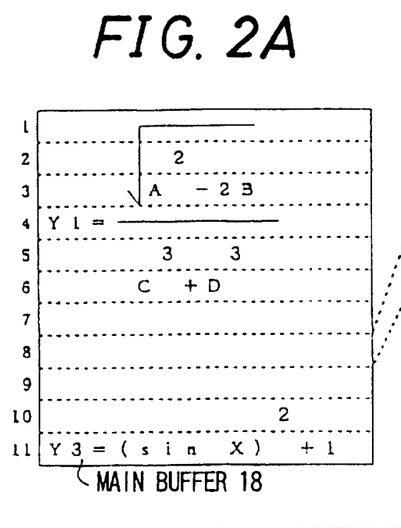
FIGS. 2A, 2B, 2C and 2D are diagrams showing examples of forming a display according to a first embodiment.
Figure 2B:
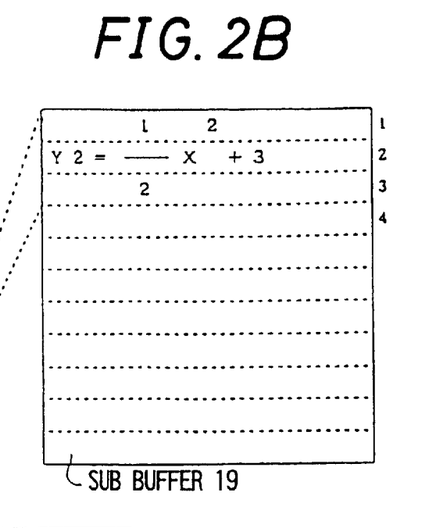

As shown in FIGS. 2A and 2B, two buffers of the main buffer 18 and the sub buffer 19 are prepared as display forming buffers, whereby display data of unedited mathematical expressions (expressions Y1 and Y3) are stored into the main buffer 18 as shown in FIG. 2A and display data of a mathematical expression (expression Y2) which is being edited is stored into the sub buffer 19 as shown in FIG. 2B.

Figure 2C:
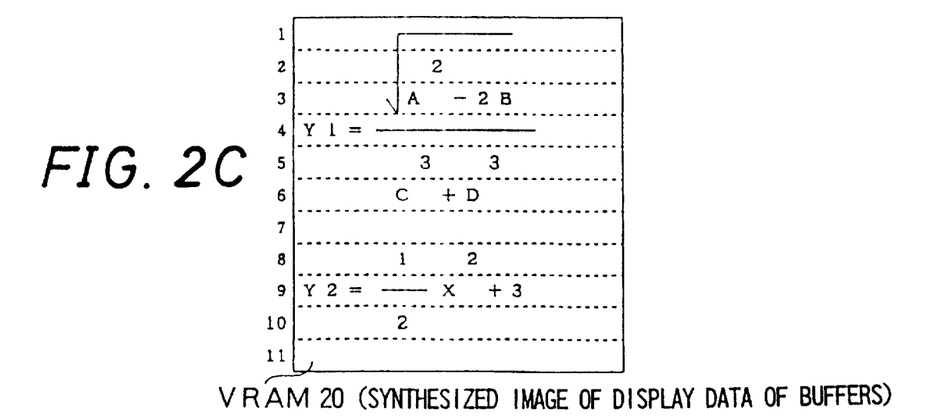
Figure 2D:
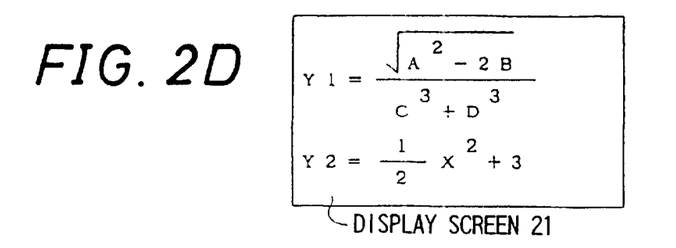

On the basis of the display data of the two buffers 18 and 19, as shown in FIG. 2C, the expressions are synthesized so that the expression Y2 is interposed between the expression Y1 and the expression Y3 and developed on the liquid crystal display 6, with the result that an actual display screen 21 is formed as shown in FIG. 2D.

Figure 3:
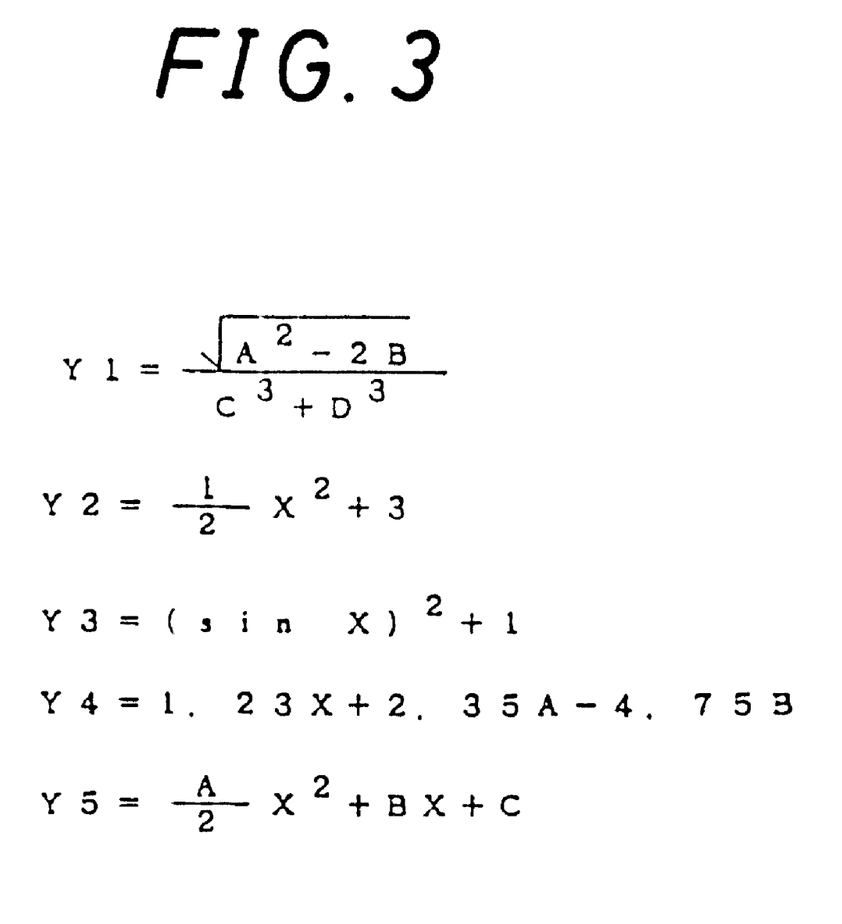
FIG. 3 is a diagram showing concrete examples of mathematical expressions.

Hereinafter, a first embodiment will be explained with referring to FIGS. 3, 4A, 4B, 4C, 4D, 5A, 5B, 5C and 5D. Incidentally, it is supposed that when a plurality of mathematical expressions are displayed, an expression which is the object to edit can be changed by moving a cursor between respective expressions. Further, it is supposed that five expressions of Y1 through Y5 shown in FIG. 3 are previously inputted. The number of display lines is assumed to be seven and a display is performed in an image that adjacent lines are respectively overlapped (half-line-feeding image), it follows that data for 13 lines are treated in the display data buffer (VRAM).

The procedure of forming a display when the cursor is disposed on the expression Y2 and the expression Y2 is being edited will be explained with referring to FIGS. 4A, 4B, 4C and 4D.

Figure 4A:
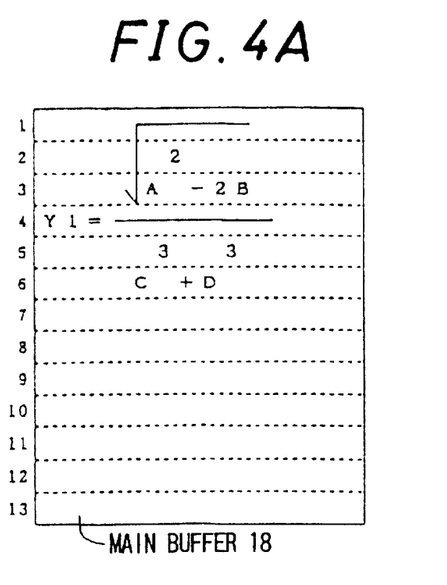
FIGS. 4A, 4B, 4C and 4D are diagrams showing examples of storing in respective buffers according to the first embodiment.
Figure 4B:
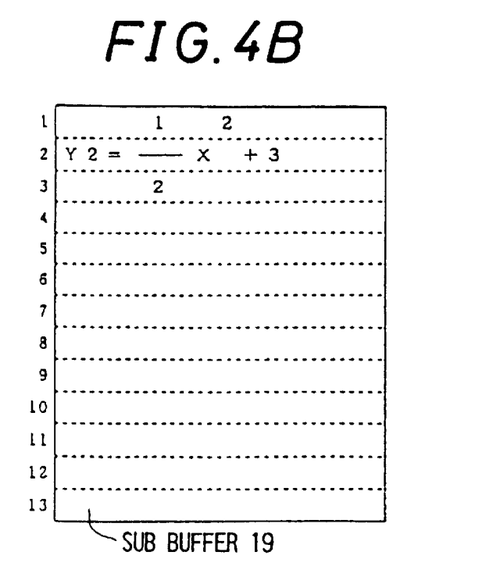
Figure 4C:
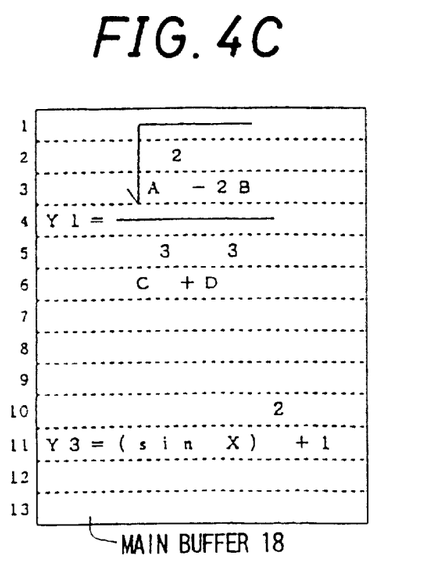
Figure 4D:
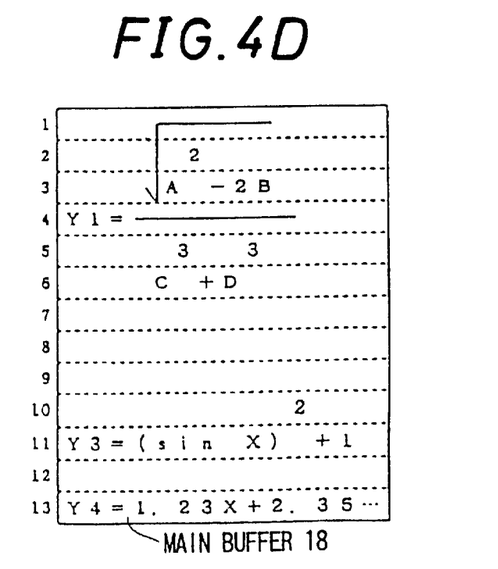

First, as shown in FIG. 4A, display data of Y1 is formed on first to sixth lines on the main buffer 18. Next, three lines on the main buffer, i.e. a line on which Y2 is to be displayed (8th line) and lines for preventing Y2 from overlapping expressions which are above and below Y2 (7th and 9th lines), a re caused to be blank lines. Then, as shown in FIG. 4B, display data of Y2 is formed on the sub buffer 19. Successively, from the next line to the blank lines of the main buffer 18 down to the lowermost line of the ma in buffer 18, display data of Y3 (10th and 11th lines), one blank line (12th line) as shown in FIG. 4C, and display data of Y4 (13th line) as shown in FIG. 4D are formed in this order.

Figure 5A:
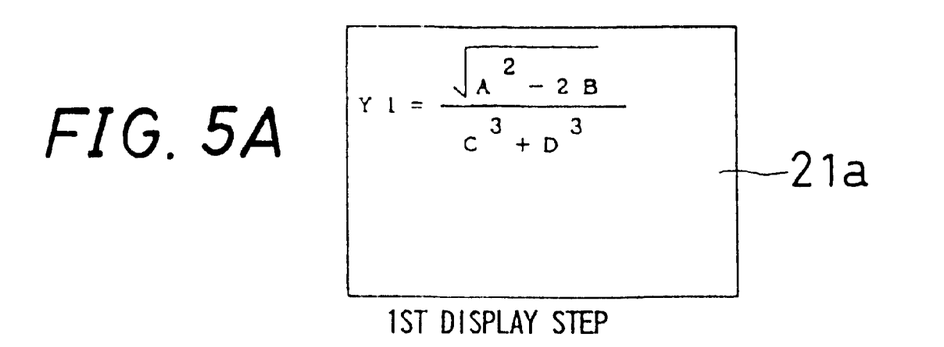
FIGS. 5A, 5B and 5C are diagrams showing display steps according to the first embodiment.

On the basis of the data formed in the two buffers 18 and 19, firstly, as shown in FIG. 5A, a portion from the top to the blank line (7th line) of the main buffer 18 is developed on the liquid crystal display 6 in half-line-feeding image, so that a display screen 21a of Y1 is formed.

Figure 5B:
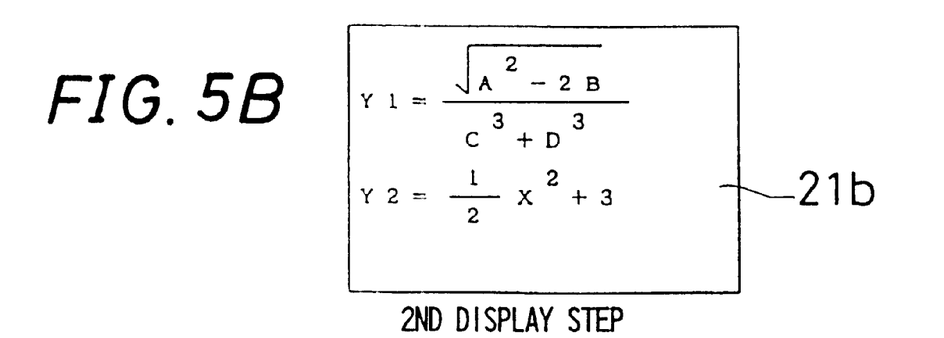
Figure 5C:
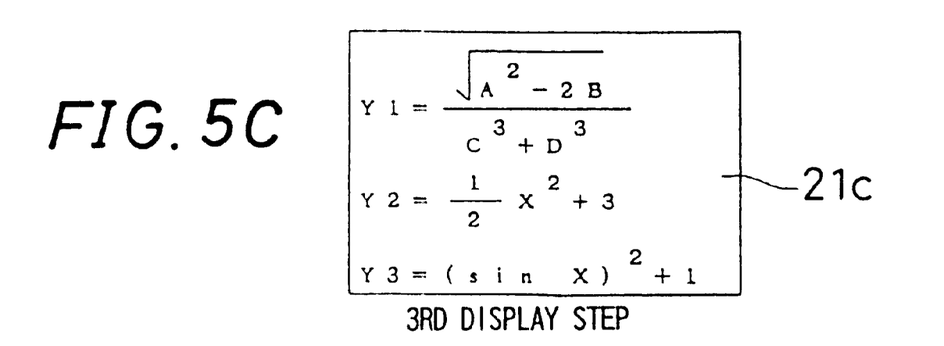

Next, as shown in FIG. 5B, in place of the eighth line of the main buffer 18, the display data of Y2 (1st to 3rd lines) in the sub buffer 19 is developed in half-line-feeding image to form a display screen 21b of Y1 and Y2. Finally, a portion below the blank line (9th line) of the main buffer 18 is similarly developed in half-line-feeding image, with the result that, as shown in FIG. 5C, a display screen 21c of the plurality of expressions Y1 through Y3 can be displayed on the liquid crystal display 6 in textbook book format.

Figure 5D:
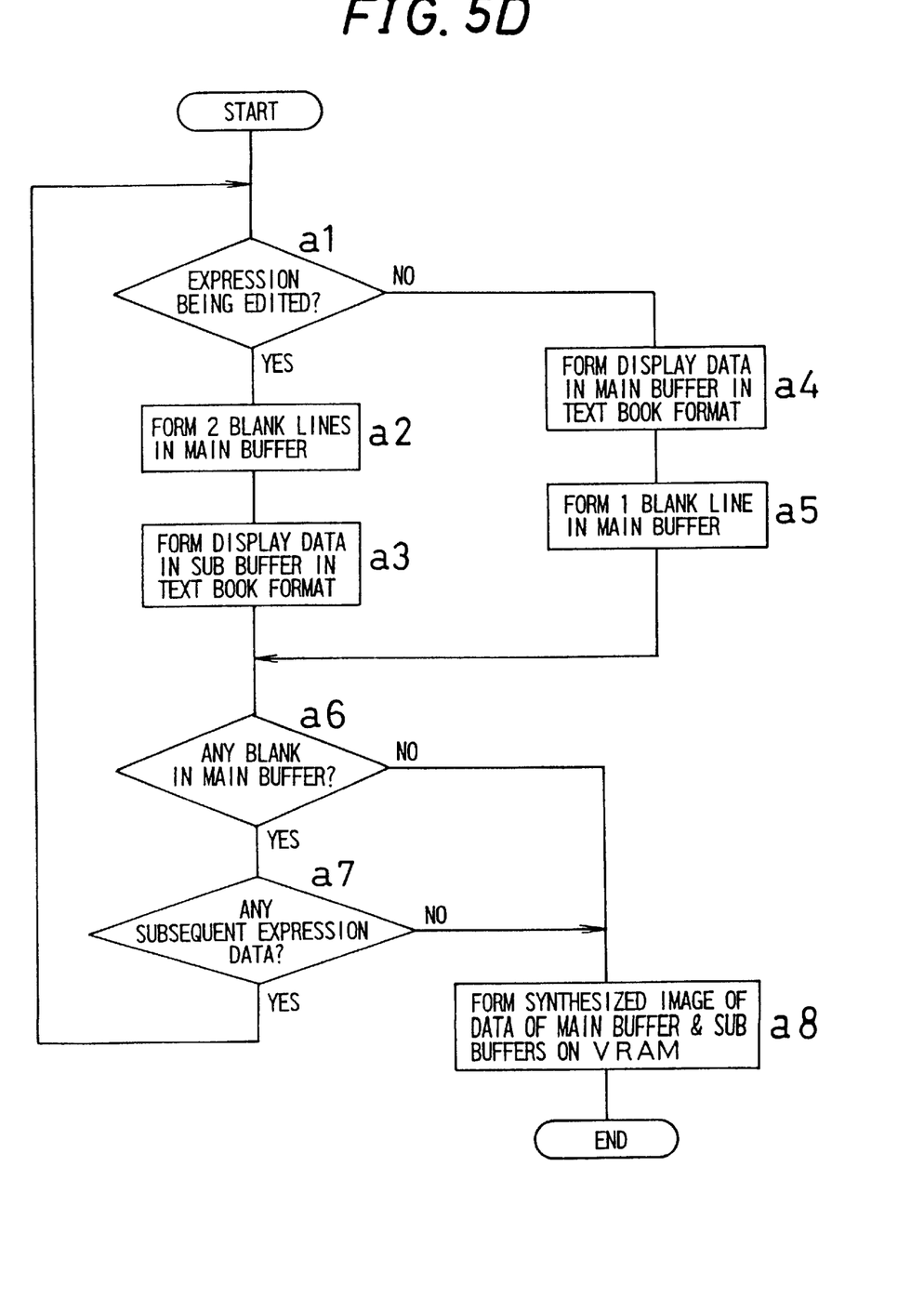
FIG. 5D is a flow chart showing an operation of displaying a mathematical expression according to the first embodiment.

FIG. 5D is a flow chart showing an operation of displaying a mathematical expression in an apparatus of the first embodiment. At step a1 where the operation of displaying a mathematical expression is started, it is judged whether a designated mathematical expression is a mathematical expression being edited. When the mathematical expression is being edited, the operation proceeds to step a2, where two blank lines are formed in the main buffer 18, and thereafter, the operation proceeds to step a3, where display data of the designated mathematical expression is formed in the sub buffer 19 in textbook book format. Then, the operation proceeds to step a6. When the mathematical expression is not being edited at step a1, the operation proceeds to step a4, where display data of the designated mathematical expression is formed in the main buffer 18 in textbook book format, and thereafter, the operation proceeds to step a5, where one blank line is formed in the main buffer 18. Then, the operation proceeds to step a6.

When there are blank lines in the main buffer 18 at step a6 and when there is a subsequent designated mathematical expression at next step a7, the operation returns to step a1. When there is no blank line in the main buffer 18 at step a6 or when there is no subsequent designated mathematical expression at step a7, the operation proceeds to step a8 where a synthesized image of the data formed in the main buffer 18 and the sub buffer 19 is formed on VRAM 20 and the operation is finished. As a result, a plurality of mathematical expressions in textbook book format are displayed on the liquid crystal display 6.

In order to edit a plurality of mathematical expressions while displaying within the same screen, when a mathematical expression being edited is changed, and hence the number of display lines of the expression is changed, displays of unedited mathematical expressions which are formed above and below the expression are also influenced, so that it is necessary to reconstitute even displays of the unedited mathematical expressions. Particularly, when a mathematical expression is displayed in textbook book format, a display is constituted in an image that adjacent lines are respectively overlapped (half-line-feeding image), whereby it is difficult to constitute a display for the number of display lines of a screen and such a display cannot be realized in a small electronic apparatus.

Hence, in the embodiment, two buffers for display data are prepared, one of which is the main buffer for storing display data of an unedited mathematical expression and the other of which is the sub buffer for storing display data of a mathematical expression being edited, whereby the expressions are displayed on an actual display unit in an image that the display data formed stored into the two buffers are synthesized. In this case, on the assumption of a case where elements of mathematical expressions being edited become zero, display data of as numerous as possible mathematical expressions is formed on the main buffer. Accordingly, without changing display data of an unedited mathematical expression, by changing only display data of a mathematical expression being edited on the sub buffer, a plurality of mathematical expressions can be edited while being displayed within the same display screen, with the result that an edition of a plurality of mathematical expressions while displaying even in textbook format is facilitated.

(Second Embodiment)

In a second embodiment, when an inputted mathematical expression is stored inside a calculator, a format in which the expression is inputted (textbook format or one line format) is stored as an attribute of the mathematical expression, whereby the mathematical expression is displayed and reedited in accordance with the stored attribute. An attribute of a mathematical expression is stored into the expression storing buffer 17 as a portion of expression data.

Figure 6A:
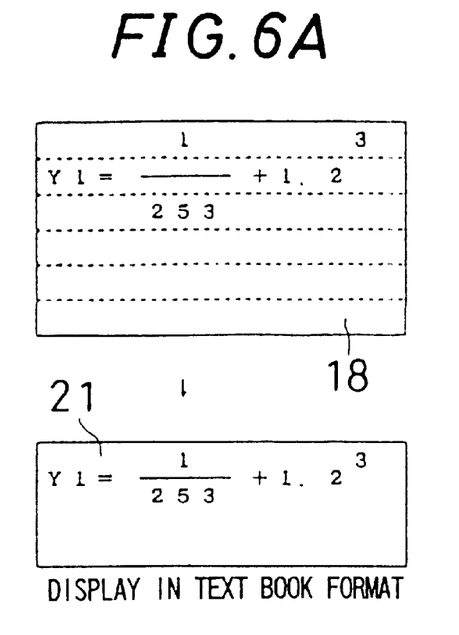
FIGS. 6A, 6B and 6C are diagrams showing examples of forming a display according to a second embodiment.
Figure 6B:
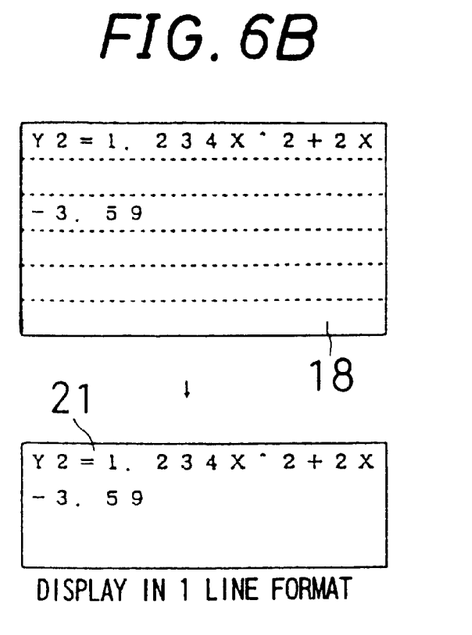
Figure 6C:
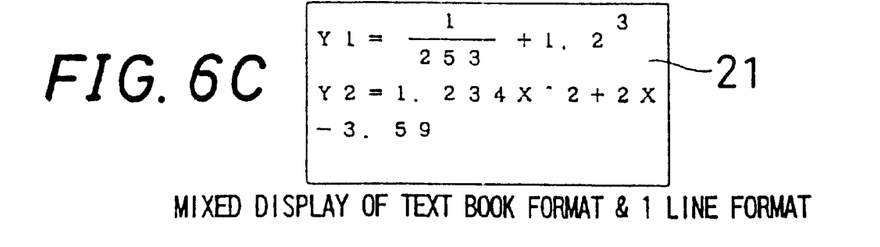

Normally, when a mathematical expression is displayed in textbook format, a display of the expression in textbook format is realized in a manner that half portions of adjacent lines are respectively overlapped (line feed is performed for half line) as shown in FIG. 6A, and therefore, when a mathematical expression is displayed in one line format as shown in FIG. 6B, display data is formed on every other line. Accordingly, a mixed display is formed as shown in FIG. 6C.

Hereinafter, the second embodiment will be explained with referring to FIGS. 3, 7A, 7B, 7C, 7D, 8A, 8B, 8C and 8D. Incidentally, in FIG. 3, it is supposed that each of Y1, Y2, Y3 and Y5 is inputted in textbook format and Y4 is inputted in one line format.

The procedure of forming a display in the case where the expression Y2 is displayed on the top, the cursor is disposed on the expression Y4, and Y4 is being edited, will be explained with referring to FIGS. 7A, 7B, 7C and 7D.

Figure 7A:
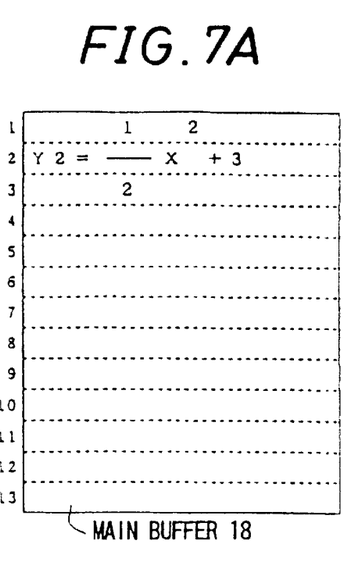
FIGS. 7A, 7B, 7C and 7D are diagrams showing examples of storing in respective buffers according to the second embodiment.
Figure 7B:
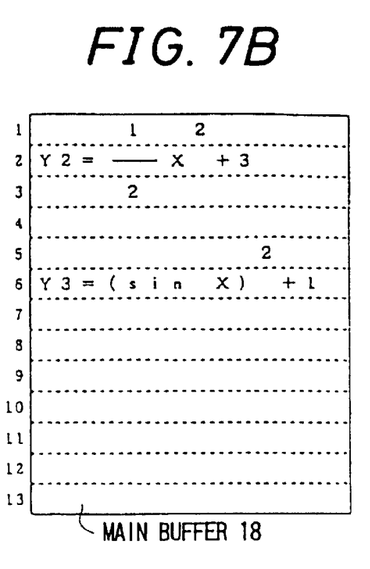
Figure 7C:
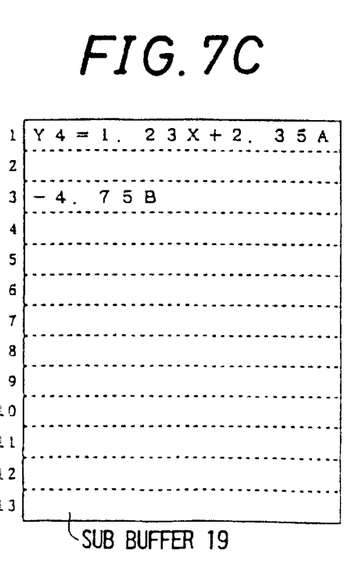
Figure 7D:
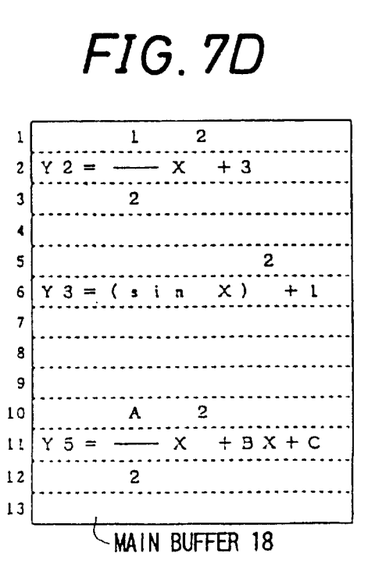

First, as shown in FIG. 7A, display data of Y2 is formed on first line to third line on the main buffer 18. Fourth line is blanked, and as shown in FIG. 7B, display data of Y3 is formed on fifth line to sixth line. Next, three lines on the main buffer, i.e., a line on which Y4 is to be displayed (8th line) and lines for preventing Y4 from overlapping expressions which are above and below Y4 (7th and 9th lines), are caused to be blank lines. Then, display data of Y4 is formed on the sub buffer 19. At this time, since Y4 is inputted in one line format, as shown in FIG. 7C, display data is formed on every other line. Successively, as shown in FIG. 7D, display data of Y5 is formed from upon 10th line in the main buffer 18.

Figure 8A:
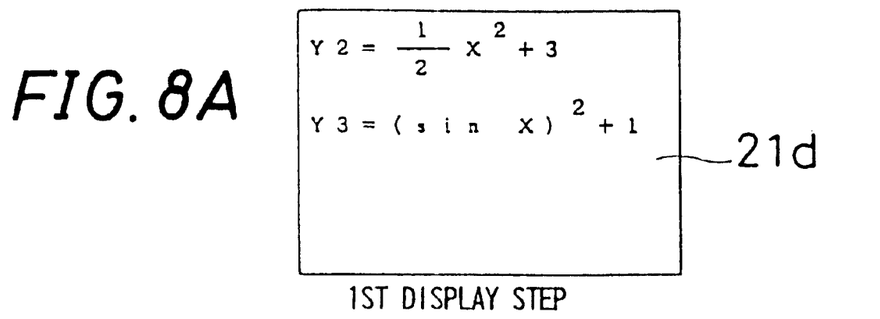
FIGS. 8A, 8B and 8C are diagrams showing display steps according to the second embodiment.

On the basis of the data formed in the two buffers 18 and 19, firstly, as shown in FIG. 8A, a portion from the top to the blank line (7th line) of the main buffer 18 is developed on the liquid crystal display 6 in half-line-feeding image to form a display screen 21d of Y2 and Y3.

Figure 8B:
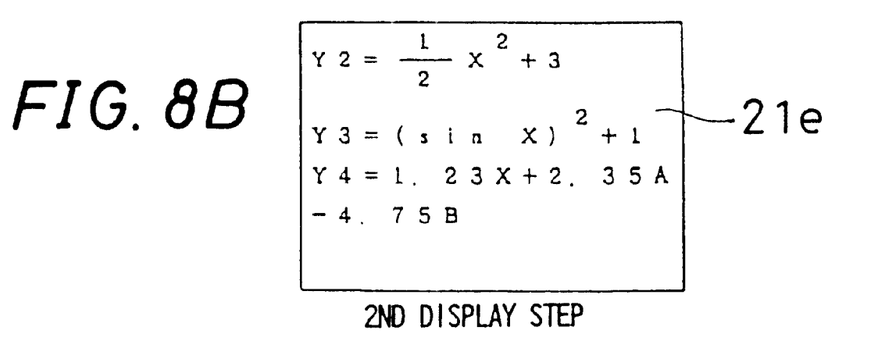
Figure 8C:
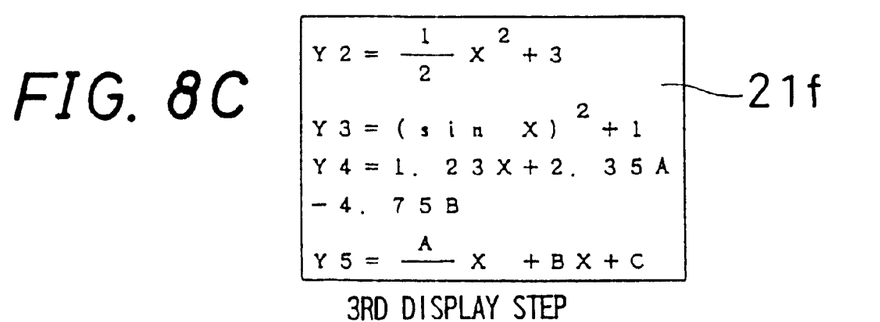

Next, as shown in FIG. 8B, in place of the eighth line of the main buffer 18, the display data of Y4 (1st through 3rd lines) in the sub buffer 19 is developed in half-line-feeding image to form a display screen 21e of Y2 through Y4. Finally, a portion below the blank line (9th line) of the main buffer 18 is similarly developed in half-line-feeding image, with the result that, as shown in FIG. 8C, a display screen 21f of the plurality of expressions Y2 through Y5 can be displayed on the liquid crystal display 6 in textbook book format.

Figure 8D:
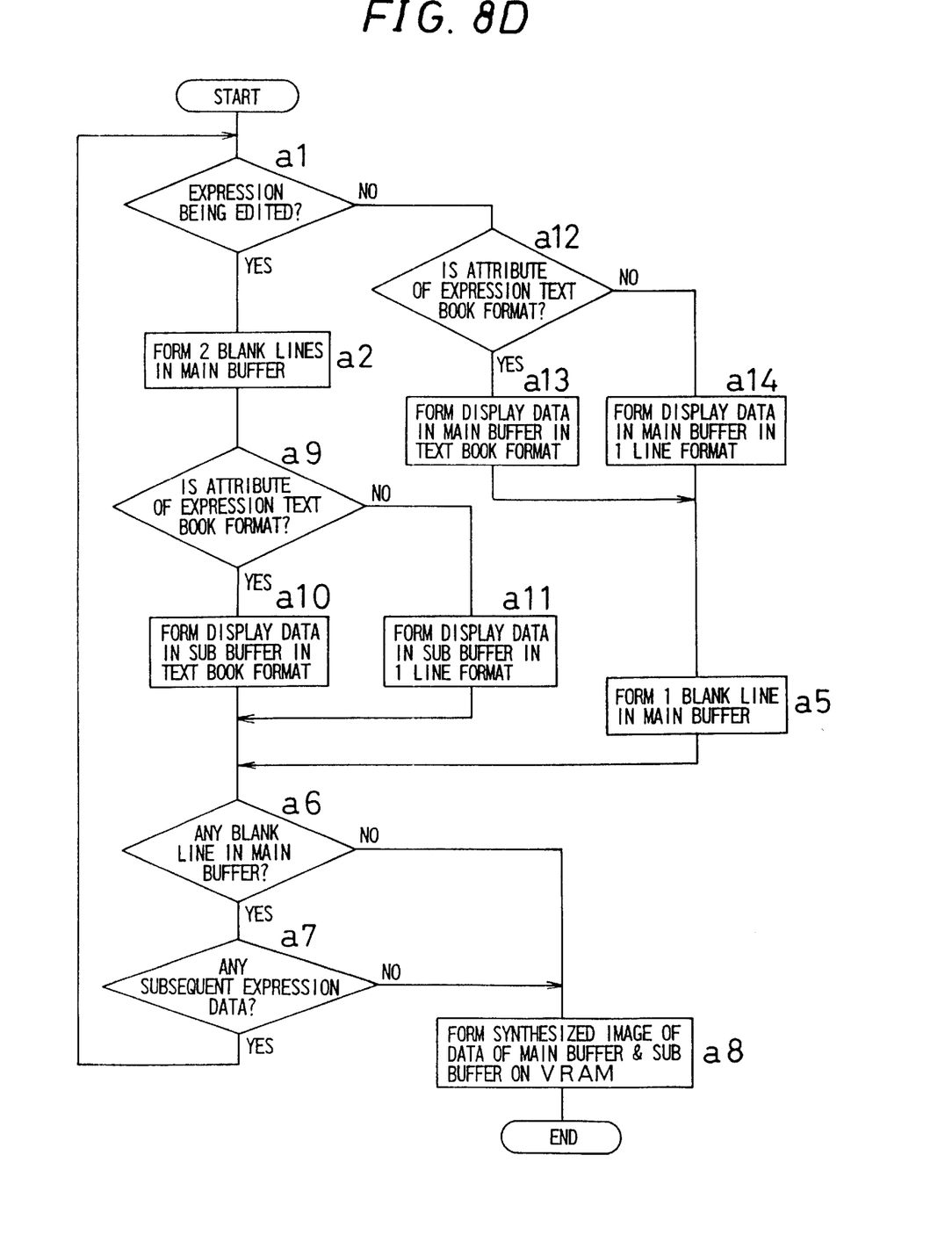
FIG. 8D is a flow chart showing an operation of displaying a mathematical expression according to the second embodiment.

FIG. 8D is a flow chart showing an operation of displaying a mathematical expression in an apparatus of the second embodiment. At step a1 where the operation of displaying a mathematical expression is started, it is judged whether a designated mathematical expression is a mathematical expression being edited. When the mathematical expression is being edited, the operation proceeds to step a2, where two blank lines are formed in the main buffer 18, and thereafter, the operation proceeds to step a9, where it is judged whether an attribute of the designated mathematical expression is textbook book format. When the attribute is textbook book format, the operation proceeds to step a10, where display data of the designated mathematical expression is formed in the sub buffer 19 in textbook book format. Then, the operation proceeds to step a6. When it is judged that the attribute is not textbook book format at step a9, that is, when the attribute is the one line format, the operation proceeds to step a11, where display data of the designated mathematical expression is formed in the sub buffer 19 in one line format. Then, the operation proceeds to step a6.

When the mathematical expression is not being edited at step a1, the operation proceeds to step a12, where it is judged whether an attribute of the designated mathematical expression is textbook format. When the attribute is textbook format, the operation proceeds to step a13, where display data of the designated mathematical expression is formed in the main buffer 18 in textbook format. Then, the operation proceeds to step a5. When at step a12 the attribute is judged not to be textbook format, that is, the attribute is the one line format, the operation proceeds to step a14, where display data of the designated mathematical expression is formed in the main buffer 18 in one line format. Then, the operation proceeds to step a5. At step a5, one blank line is formed in the main buffer 18. Then, the operation proceeds to step a6.

Thereafter, the operation of steps a6 through a8 is performed in the same manner as explained in reference to FIG. 5D, and then the operation is finished. Accordingly, a plurality of mathematical expressions are displayed on the liquid crystal display 6 in a manner that textbook format and the one line format coexist.

According to the embodiment, in the course of inputting a mathematical expression, when the expression is inputted, a display format is selected from textbook book format and the one line format, and the selected display format is stored as an attribute of the expression, with the result that a mathematical expression can be displayed and edited in a display format which is suitable for the mathematical expression. Further, an image that line feed is performed for half line, which is used when a display is formed in textbook format, is applied also to the one line format to form display data on every other line, so that a plurality of mathematical expressions can be inputted and edited in a state that textbook format and the one line format coexist.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A small electronic apparatus for inputting and displaying mathematical expressions in textbook format and one line format is characterized in that a plurality of mathematical expressions can be inputted and displayed within one and the same screen in textbook format, the apparatus comprising:
   a keyboard for inputting the plurality of mathematical expressions in textbook format and one line format;
   a first memory for storing the plurality of inputted mathematical expressions in an order in which the expressions are inputted;
   a first buffer for storing mathematical expressions that are not edited;
   a second buffer for storing mathematical expressions that are edited;
   a processor for editing the mathematical expressions stored in the second buffer, forming a blank region of predetermined size in the first buffer when a mathematical expression is being edited, and forming synthesized images of the edited mathematical expressions and the mathematical expressions stored in the first buffer when there is no blank region of predetermined size in the first buffer;
   a second memory in which is formed the synthesized images of the mathematical expressions stored in the first buffer and the edited mathematical expressions stored in the second buffer in the order in which the first buffer and edited second buffer expressions are inputted in said second memory; and
   wherein the screen displays mathematical expressions contained in the synthesized images in textbook format.

2. The small electronic apparatus of claim 1 wherein the screen displays mathematical expressions contained in the synthesized images not only a mathematical expression in textbook format but also in one line format.

3. The small electronic apparatus of claim 1 wherein display data for forming the displays of mathematical expressions is developed in half-line-feeding image.

4. The small electronic apparatus of claim 1 wherein the blank region of predetermined size is a plurality of blank lines.

5. A small electronic apparatus for inputting and displaying mathematical expressions in textbook format and one line format is characterized in that a plurality of mathematical expressions can be inputted and displayed within one and the same screen in a state that textbook format and one line format coexist, the apparatus comprising:
   a keyboard for inputting in textbook format and one line format a plurality of the mathematical expressions;
   a first memory for storing the plurality of inputted mathematical expressions in an order in which the expressions are inputted;
   a main buffer for storing mathematical expressions not to be edited;
   an expression storing buffer for storing as an attribute the textbook format or one line format of inputted mathematical expressions;
   a sub buffer for storing mathematical expressions to be edited;
   a processor for editing the mathematical expressions stored in the sub buffer, forming a blank region of predetermined size in the main buffer when a mathematical expression is being edited, and forming synthesized images of the edited mathematical expressions and the mathematical expressions stored in the main buffer when there is no blank region of predetermined size in the main buffer;
   a second memory in which is formed the synthesized images of the edited mathematical expressions stored in the sub buffer in the order in which the main buffer and edited sub buffer expressions are inputted in said second memory; and
   wherein the screen displays mathematical expressions contained in the synthesized images in textbook format and one-line format.

6. The small electronic apparatus of claim 5 wherein display data for forming the displays of mathematical expressions stored in the main and sub buffers is developed in half-line-feeding image to form the displayed mathematical expressions.

7. The small electronic apparatus as recited in claim 5 wherein the blank region of predetermined size is a plurality of blank lines.

8. A small electronic computing apparatus comprising:

inputting means for inputting a plurality of mathematical expressions in textbook format;

storing means for storing the plurality of inputted mathematical expressions in an order in which the expressions are inputted;

designating means for designating one of the plurality of inputted mathematical expressions;

editing means for editing the designated mathematical expression, the editing means having a first buffer for storing mathematical expressions not to be edited and a second buffer for storing mathematical expressions to be edited, the first buffer containing a blank region of predetermined size for each mathematical expression to be edited; and displaying means for synthesizing and displaying the mathematical expressions stored in the respective buffers in the order in which the expressions are inputted when there is no blank region in the first buffer.

9. The small electronic calculating apparatus of claim 8 wherein the inputting means is for inputting not only a mathematical expression in textbook format but also a mathematical expression in the one line format.

10. The small electronic apparatus of claim 8 wherein the display means displays the mathematical expressions stored in the respective buffers in textbook format and one line format.

11. The small electronic calculating apparatus of claim 8 wherein display data for forming the displays of mathematical expressions stored in the first and second buffers is developed in half-line-feeding image to form the displayed mathematical expressions.

12. The small electronic computing apparatus of claim 8 wherein the blank region of predetermined size is a plurality of blank lines.

13. A small electronic apparatus comprising:

inputting means for inputting a plurality of mathematical expressions in textbook book format;

storing means for storing the plurality of inputted mathematical expressions in an order in which the expressions are inputted;

designating means for designating one of the plurality of inputted mathematical expressions;

editing means for editing the designated mathematical expression, the editing means having a first buffer for storing mathematical expressions not to be edited and a second buffer for storing mathematical expressions to be edited;

displaying means for synthesizing and displaying the mathematical expressions stored in the respective buffers in the order in which the expressions are inputted; and edit controlling means for, when there is a blank region in the first buffer and a mathematical expression is subsequently designated, judging whether the designated mathematical expression is a mathematical expression to be edited, and for, when the mathematical expression is judged to be edited, forming a predetermined sized blank region in the first buffer as well as storing the designated mathematical expression into the second buffer, and when the mathematical expression is judged not to be edited, storing the designated mathematical expression into the first buffer as well as forming a predetermined sized blank region in the first buffer.

14. A small electronic apparatus comprising:

inputting means for inputting a plurality of mathematical expressions in textbook format;

storing means for storing the plurality of inputted mathematical expressions in an order in which the expressions are inputted;

designating means for designating one of the plurality of inputted mathematical expressions;

editing means for editing the designated mathematical expression, the editing means having a first buffer for storing mathematical expressions not to be edited and a second buffer for storing mathematical expressions to be edited, the first buffer containing a blank region of predetermined size for each mathematical expression stored in the second buffer for editing;

displaying means for synthesizing and displaying the mathematical expressions stored in the respective buffers in the order in which the expressions are inputted; and wherein the displaying means, when there is no predetermined sized blank region in the first buffers or when no mathematical expressions is subsequently designated, synthesizes and displays mathematical expressions stored in the respective buffers in an order in which the expressions are inputted.

15. The small electronic calculating apparatus of claim 14 wherein display data for forming the displays of mathematical expressions is developed in half-line-feeding image.

16. The small electronic computing apparatus of claim 14 wherein the blank region of predetermined size is a plurality of blank lines.

* * * * *